(12) United States Patent
Smith et al.

(10) Patent No.: US 9,141,923 B2
(45) Date of Patent: Sep. 22, 2015

(54) OPTIMIZING CONTRACTUAL MANAGEMENT OF THE TOTAL OUTPUT OF A FLEET OF FUEL CELLS

(71) Applicant: Bloom Energy Corporation, Sunnyvale, CA (US)

(72) Inventors: James Smith, Sunnyvale, CA (US); David Weingaertner, Sunnyvale, CA (US); Pramod Vachhani, Sunnyvale, CA (US); Brent Miller, Sunnyvale, CA (US); Ram Ramanan, San Jose, CA (US); Arne Ballantine, Palo Alto, CA (US); Swaminathan Venkataraman, Cupertino, CA (US); Deepak Shukla, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 270 days.

(21) Appl. No.: 13/626,560

(22) Filed: Sep. 25, 2012

(65) Prior Publication Data
US 2014/0089055 A1    Mar. 27, 2014

(51) Int. Cl.
| G06Q 50/06 | (2012.01) |
| G06Q 10/06 | (2012.01) |
| H01M 8/04 | (2006.01) |
| H01M 8/24 | (2006.01) |

(52) U.S. Cl.
CPC .......... *G06Q 10/0631* (2013.01); *G06Q 50/06* (2013.01); *H01M 8/0494* (2013.01); *H01M 8/04619* (2013.01); *H01M 8/04992* (2013.01); *H01M 8/249* (2013.01); *Y02E 60/50* (2013.01)

(58) Field of Classification Search
CPC .......... H02J 3/387; Y04S 10/54; Y02E 60/50; G06F 1/3206
See application file for complete search history.

(56) References Cited

U.S. PATENT DOCUMENTS

| 5,485,600 A | 1/1996 | Joseph et al. |
| 5,640,508 A | 6/1997 | Fujiwara et al. |
| 6,376,111 B1 | 4/2002 | Mathias et al. |

(Continued)

FOREIGN PATENT DOCUMENTS

| EP | 1501146 A2 | 1/2005 |
| JP | 2004-180455 | 6/2004 |

(Continued)

OTHER PUBLICATIONS

Anonymous, Presentation of the LabView-based software used in the Fuel Cell Technologies. Testing System. Internet Article, Jul. 15, 2004, http://web.archive.org/web/20040715025135/fuelcelltechnologies.com/Support/Downloads/Tutorial.pdf.

(Continued)

*Primary Examiner* — Scott L Jarrett
(74) *Attorney, Agent, or Firm* — The Marbury Law Group PLLC

(57) ABSTRACT

A fuel cell fleet has a plurality of fuel cell systems each connected to a data server. The data server may be configured to obtain operational data from of the plurality of fuel cell systems. An efficiency controller operably connected to the data server and is configured to predict an efficiency and a power output of the fleet from the operational data and optimize the efficiency of the fleet to minimize the fleet fuel consumption while maintaining a desired fleet output power. The efficiency may be determined by a ratio of the fleet output current or output power to the fleet fuel consumption.

5 Claims, 11 Drawing Sheets

(56) References Cited

U.S. PATENT DOCUMENTS

| | | | |
|---|---|---|---|
| 6,383,670 | B1 | 5/2002 | Edlund et al. |
| 6,389,558 | B1 | 5/2002 | Herrmann et al. |
| 6,487,508 | B1* | 11/2002 | Suzuki et al. ............... 702/61 |
| 6,833,205 | B2 | 12/2004 | Speranza et al. |
| 6,924,053 | B2 | 8/2005 | McElroy |
| 7,362,557 | B2 | 4/2008 | Soudier et al. |
| 7,422,810 | B2 | 9/2008 | Venkataraman et al. |
| 7,569,293 | B1* | 8/2009 | Cross, III ............... 429/412 |
| 7,599,760 | B2 | 10/2009 | Dutta et al. |
| 8,185,214 | B2 | 5/2012 | Dutta et al. |
| 8,909,950 | B1* | 12/2014 | Levchuk et al. ............... 713/300 |
| 2002/0103745 | A1 | 8/2002 | Lof et al. ............... 705/37 |
| 2002/0143438 | A1* | 10/2002 | Akiyama et al. ............... 700/286 |
| 2002/0192516 | A1 | 12/2002 | Tajima |
| 2004/0081867 | A1 | 4/2004 | Edlund |
| 2004/0095023 | A1* | 5/2004 | Jacobson et al. ............... 307/80 |
| 2004/0142216 | A1 | 7/2004 | Wakabayashi et al. |
| 2004/0144579 | A1 | 7/2004 | Hasuka et al. |
| 2004/0202914 | A1 | 10/2004 | Sridhar et al. |
| 2004/0217732 | A1 | 11/2004 | Zhu et al. |
| 2004/0225514 | A1* | 11/2004 | Greenshields et al. ............... 705/1 |
| 2004/0267467 | A1 | 12/2004 | Gopal |
| 2005/0048336 | A1 | 3/2005 | Takebe et al. |
| 2005/0164051 | A1 | 7/2005 | Venkataraman et al. |
| 2008/0028237 | A1* | 1/2008 | Knight ............... 713/300 |
| 2008/0166604 | A1* | 7/2008 | Weingaertner et al. ......... 429/13 |
| 2008/0254329 | A1 | 10/2008 | Sugiura et al. |
| 2009/0066291 | A1* | 3/2009 | Tien et al. ............... 320/118 |
| 2009/0305087 | A1* | 12/2009 | Rajashekara et al. ............ 429/13 |
| 2010/0009220 | A1* | 1/2010 | Higdon ............... 429/13 |
| 2010/0082172 | A1* | 4/2010 | Ko et al. ............... 700/291 |
| 2010/0117568 | A1* | 5/2010 | Iwashita et al. ......... 318/400.02 |
| 2010/0173211 | A1* | 7/2010 | Kim et al. ............... 429/432 |
| 2010/0318233 | A1* | 12/2010 | Yunes et al. ............... 700/287 |
| 2011/0119514 | A1* | 5/2011 | Kim et al. ............... 713/340 |
| 2011/0283119 | A1* | 11/2011 | Szu et al. ............... 713/300 |
| 2012/0010757 | A1* | 1/2012 | Francino et al. ............ 700/291 |
| 2012/0010758 | A1* | 1/2012 | Francino et al. ............ 700/291 |
| 2012/0016528 | A1* | 1/2012 | Raman et al. ............... 700/291 |
| 2012/0103395 | A1* | 5/2012 | Prengler et al. ............... 136/248 |
| 2012/0133337 | A1* | 5/2012 | Rombouts et al. ............ 320/155 |
| 2012/0304673 | A1* | 12/2012 | Betts ............... 62/79 |
| 2013/0020868 | A1* | 1/2013 | Wu et al. ............... 307/18 |
| 2014/0067140 | A1* | 3/2014 | Gow ............... 700/291 |
| 2014/0094979 | A1* | 4/2014 | Mansfield ............... 700/291 |
| 2014/0094985 | A1* | 4/2014 | Hibiya et al. ............... 700/297 |

FOREIGN PATENT DOCUMENTS

| | | |
|---|---|---|
| JP | 2005-203381 | 7/2005 |
| WO | WO2004/092756 A1 | 10/2004 |

OTHER PUBLICATIONS

Hamburger, R. O., et al., "LabView DSC Automates Fuel Cell Catalyst Research," Nov. 4, 2004, http://web.archive.org/web/20041104200039/http://bloomy.com/newsletters/fuelcellresearch.pdf.

International Search Report and Written Opinion received in connection with international application No. PCT/US2013/061230; mailed Jan. 29, 2014.

International Preliminary Report on Patentability received in connection with international application No. PCT/US2013/061230; mailed Apr. 9, 2015.

* cited by examiner

OPTIMIZING CONTRACTUAL MANAGEMENT OF THE TOTAL OUTPUT OF A FLEET OF FUEL CELLS

BACKGROUND

The present invention relates generally to the field of power generation optimization and management. Specifically, the present invention is directed to optimize operation of a fleet of fuel cell systems to achieve an objective or a set of objectives.

The following description of the background of the invention is provided simply as an aid in understanding the invention and is not admitted to describe or constitute prior art to the invention.

Industrial power generation capability may be provided to a customer as a fleet of fuel cell modules that are managed to achieve an objective or a set of objectives. The objectives may vary depending on the business model under which the power generation is provided.

Given the complex interactions between independent variables that relate to the objectives of the fleet, there is a need to automate the collection of real-time operational data from fuel cell systems and the control of the systems within the fleet and to achieve one or more operational objectives.

SUMMARY

An embodiment is directed to a power generator. A fuel cell fleet has a plurality of fuel cell systems each connected to a data server. The data server may be configured to obtain operational data from of the plurality of fuel cell systems. An efficiency controller is operably connected to the data server. The efficiency controller is configured to predict an efficiency and a power output of the fleet from the operational data and to optimize the efficiency of the fleet to minimize the fleet fuel consumption while maintaining a desired fleet output power. The efficiency may be determined by a ratio of the fleet output current or output power to the fleet fuel consumption.

Another embodiment is directed to a power generator. A fuel cell fleet has a plurality of fuel cell systems each connected to a data server. In this embodiment, at least one or more of the plurality of fuel cell systems is operational. The data server is configured to obtain operational data from each of the plurality of fuel cell systems. The data server is operably connected to a total maintained output (TMO) controller. The TMO controller is configured to determine a TMO power for the fleet integrated over a time period from the operational data, compare the TMO power over the time period to a TMO power set point established for the fleet, and increase the power output of the operational fuel cell systems of the fleet when the TMO power over the time period is less than the TMO power set point.

Another embodiment is directed to method for optimizing the efficiency of a fuel cell fleet having a plurality of fuel cell systems each containing a plurality of fuel cell modules. The desired output power for the fleet is set by a power controller. An efficiency for the fleet is achieved by controlling an efficiency controller to optimize the fleet output power set by the power controller. The efficiency may be determined by a ratio of the fleet output current or output power to the fleet fuel consumption.

Another embodiment is directed to a method for optimizing the efficiency of a fuel cell system. A fuel cell segment within at least one module of the fuel cell system having a lowest fuel utilization is identified. The output current of the identified fuel cell segment is increased by an increment of current. The module is evaluated and action is taken. For example, the action may include maintaining operating conditions, removing the increment of current from the identified segment, increasing the output current of the identified segment by a second increment of current, and selecting a different segment for the application of a third increment of current.

Another embodiment is directed to a method for optimizing a profit of a fuel cell fleet having a plurality of fuel cell systems each containing a plurality of fuel cell modules. The method includes accessing process data regarding the fleet such that the fleet is modeled, using a model-based cost function to calculate optimized control variables for the fleet, verifying the optimized control variables, deploying the optimized control variables to the fleet, and repeating the steps of accessing, using, verifying and deploying after the fleet reaches steady state. It is to be understood that both the foregoing general description and the following detailed description are exemplary and explanatory only, and are not restrictive of the invention as claimed.

DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
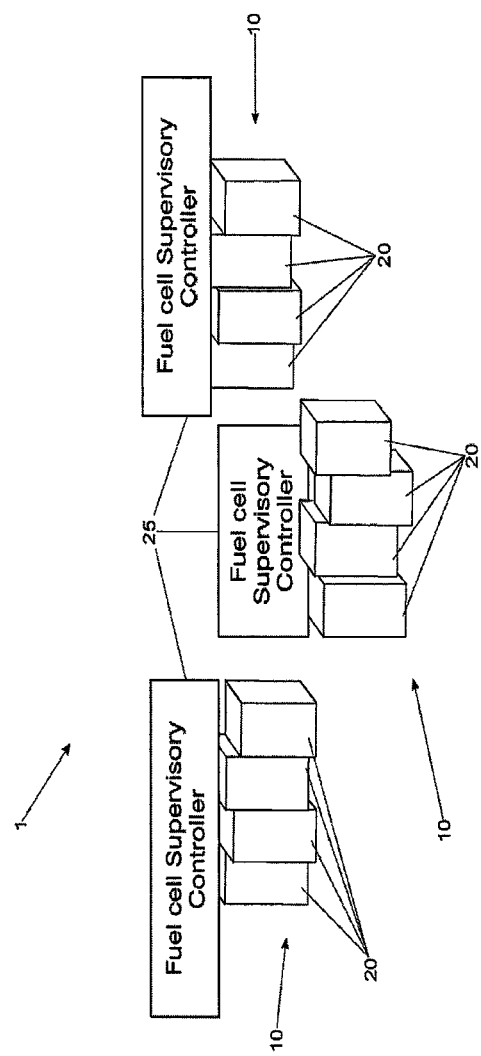
FIG. 1 is a block diagram of a modular power generation fleet.

Embodiments of the present invention will be described below with reference to the accompanying drawings. It should be understood that the following description is intended to describe exemplary embodiments of the invention, and not to limit the invention.

Equipment used to provide the power generation may be sold to the customer, in which case the customer will determine the operating objectives for the fleet. On the other hand, the supplier of the fleet may retain ownership over the fleet and sell the power generated by the fleet to the customer. Under this arrangement, the supplier establishes the objectives for the fleet and manages the fleet accordingly. At any given time, the operating characteristics of a single fuel cell system within a fuel cell fleet may be different from the operating characteristics of other fuel cell system in the fleet.

In addition, component failures, changes in power demand objectives and changes in the costs of fuel of the fuel cell fleet may require promoting one objective over another. For example, priority may be assigned to the objective of delivering a fixed amount of power from the fuel cell fleet during a billing cycle. When fuel cell systems within the fleet are off-line or operating at only partial capacity, it may be necessary to subjugate other objectives, such as operating a fuel cell system to maintain longevity of its components, on a temporary basis to meet power generation objective.

According to one embodiment, the efficiency of an individual power plant (e.g., a fuel cell system) is determined by the power output and fuel input. The fuel cell output power is used to provide the energy to drive the balance of plant (BOP) loads. After prolonged operation, the fuel cell electrical resistance increases. This requires more BOP load for cooling and causes a concomitant decrease in fuel cell output voltage. Three factors are analyzed from historically logged data. First, the BOP power is calculated by measuring the difference between the expected and the measured power. Second, the resistance of the fuel cells in the system is calculated from current and voltage measurements and a model of the fuel cells. Third, the power loss for each component in the power conditioning system (PCS) is calculated. Each of these calculations can be functions of current, system age, and other process variables.

These factors are used to generate a model of each individual fuel cell system which will predict the output power and efficiency of an individual system based upon the current set point to an individual fuel cell or a stack or column of fuel cells. A Fleet Optimizer uses the model data to predict the efficiency and power for a fleet of one or more systems. The efficiency is then optimized to minimize the fuel consumption while maintaining system output power and prolonging system life.

In another embodiment, the total maintained output (TMO) is the integrated time average output power of one or more fuel cell systems. TMO is expressed a percentage of rated nameplate output power for a system, a customer site, or a fleet of systems defined by contractual performance requirements. The TMO can be calculated on a lifetime, quarterly, monthly, or weekly basis. A TMO controller monitors the power output from a fleet of systems, integrates the value over time, and compares the result to the TMO set point required for the fleet. If one or more systems in the fleet are shut down, the TMO controller will increase the power command to the fleet in order to make up for the lost output power. The increase in power will correct for the time-integrated error caused by the lost output power. The TMO power command is sent to a fleet optimizer to minimize the fuel consumption (maximize efficiency). This will enable the contract obligations to customers to be exactly met at the end of each arbitrary billing period.

To provide context for the embodiments of the present invention, FIGS. 1-4 from commonly owned U.S. Pat. No. 7,599,760, which patent is incorporated herein by reference, are described below.

FIG. 1 is a block diagram of a modular power generation fleet 1. The power generation fleet 1 is comprised of at least one fuel cell cluster or system 10, which is made up of at least one fuel cell module 20. The terms "system" and "cluster" are used interchangeably herein. For example, three clusters or systems 10 are shown. Each cluster 10 may contain any suitable number of modules, such as one or more modules 20, for example one to twenty modules, preferably four to eight fuel cell modules. Each cluster 10 may also contain optional power conditioning/electronics (i.e., inverters and other electronics) and fuel processing (i.e., fuel treatment, fuel compressors, desulferizers, etc.) modules. Each module 20 contains a plurality of fuel cells, such as two to twenty fuel cell stacks, for example four to eight stacks and associated balance of plant components. A non-limiting example of a module 20 is described in U.S. patent application Ser. No. 11/002,681, filed Dec. 3, 2004, and U.S. Provisional Patent Application No. 60/760,933, filed Jan. 23, 2006, both herein incorporated by reference. Preferably, fuel cell module includes a separate cabinet which contains at least one fuel cell stack arranged in one or more columns located in a hot box. Preferably, every column contains plural fuel cell stacks, such as two to ten stacks, for example, four to eight stacks. Preferably, every cabinet contains plural columns, such as two to twenty columns, for example, four to eight columns. One or more, preferably two or more columns connected electrically in series make up a fuel cell segment. There may be two to twenty fuel cell segments, for example four to eight segments, with "+" and "−" electrical outputs in each hot box as described in U.S. provisional application 61/386,257, filed Sep. 24, 2010, which application is incorporated by reference herein in its entirety. Fuel cell modules are electrically and fluidly connected to the at least one fuel processing and power conditioning modules. Balance of plant components, such as blowers, valves, and control boards, etc. may be incorporated into the housing and/or the hot box.

A fuel cell supervisory controller 25 is also provided for each cluster 10. The supervisory controller 25 keeps the fuel cell cluster running safely by adjusting various operating parameters, such as the voltage to a blower VFD to maintain a constant air flow rate. The primary objective of the fuel cell supervisory controller 25 is to keep each individual fuel cell module 20 stable during the module's operation. In order to maintain stable operation of each individual fuel cell module 20, the fuel cell supervisory controller 25 controls the operation of each fuel cell module 20 in reference to a number of operational set points. The fuel cell supervisory controller 25 ensures that each fuel cell module 20 operates within an acceptable range of these operational set points, thus maintaining stable operation of each fuel cell module 20. For example, an operator sets some of the set points for the supervisory control—e.g. the reformer steam to carbon ratio, or the desired amount of power to be produced. Supervisory control happens on a very fast time scale—adjustments may occur every 100 milliseconds to every couple of seconds.

The fuel cell supervisory controller 25 is capable of controlling each individual fuel cell module 20. At any given point in time, the operating characteristics of a single fuel cell module 20 are different from that of the other fuel cell modules 20 in a system or cluster 10. The stack operating characteristics may include temperatures, pressures, pressure drops, differential pressures, fuel flow rate, power generation (i.e., current or voltage generation by module), fuel utilization, air utilization, etc. The balance of plant (BOP) operating characteristics may include pressures, pressure drops, differential pressures, power consumption (by component or cumulative), heat exchanger temperatures, heat exchanger temperature changes, heat exchanger effectiveness, reformer temperatures, water flow rate, water inventory, steam:carbon ratio, anode recycle flow rate, air flow rates (main flow rate to the fuel cells or flow rate to a fuel exhaust burner or oxidizer), etc.

However, stable operation of each fuel cell module 20 does not necessarily ensure that the power generation fleet 1 as whole is operating in the most economically efficient manner.

Figure 2:
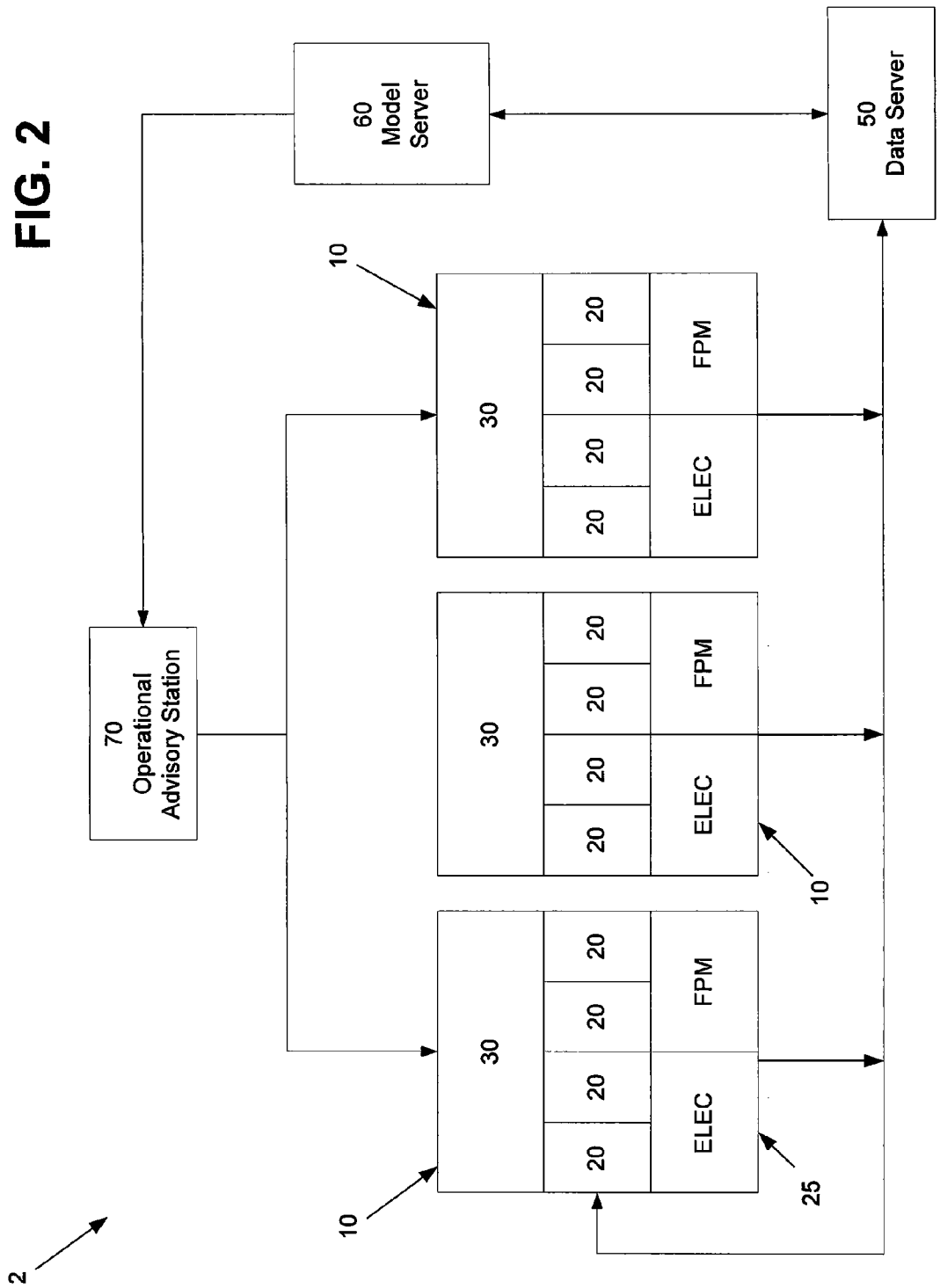
FIG. 2 is a block diagram of a power generation fleet according to an embodiment.
Figure 3:
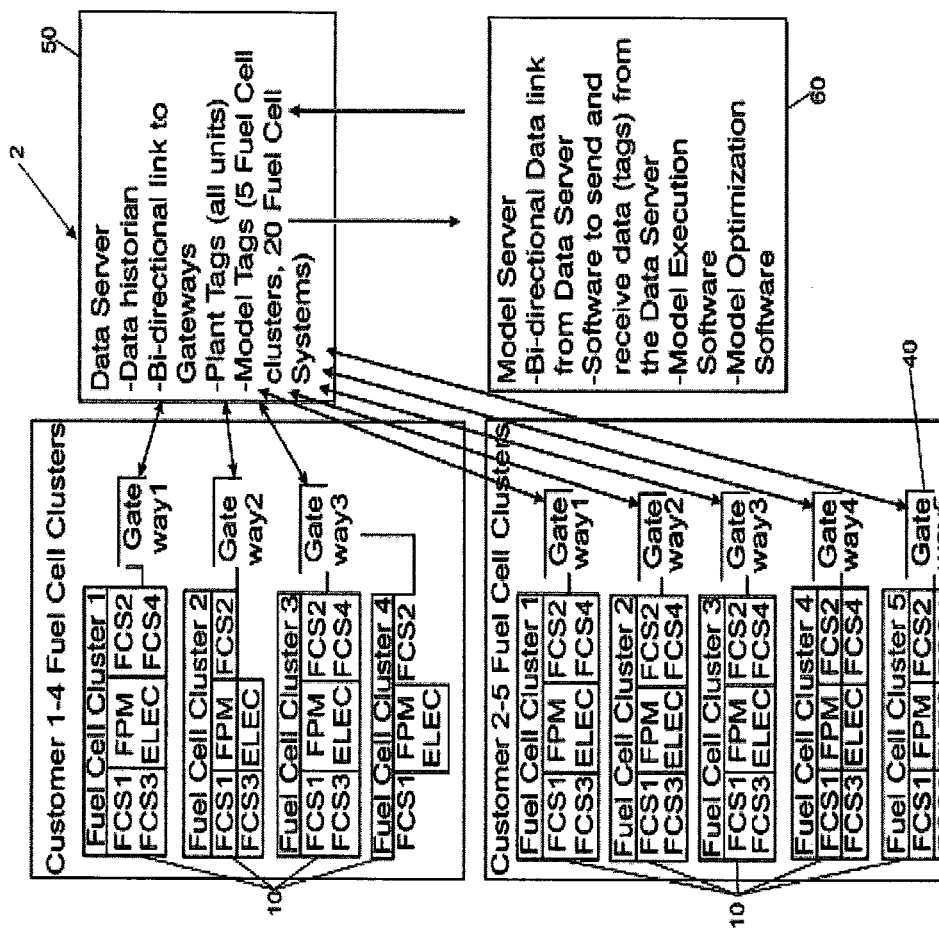
FIG. 3 is a block diagram of a power generation fleet according to an embodiment.

FIGS. 2 and 3 show a power generation system 2. The power generation system 2 includes at least one fuel cell cluster 10, such as two to ten clusters, for example, three clusters are shown in FIG. 2. Each fuel cell cluster 10 is made of one or more fuel cell modules/systems (FCS) 20. In particular, a fuel cell cluster 10 is a cluster of fuel cell modules 20 that share a common fuel processing module (FPM) and electronics module (ELEC). The electronics module includes the supervisory controller 25 shown in FIG. 1. Thus, a single fuel cell cluster 10 can be operated independently of other fuel cell clusters 10. The FPM distributes (and if required, treats) fuel from the central feed to a fuel cell cluster 10 to the individual fuel cell modules 20. The ELEC receives the power from one or more fuel cell modules 20, and modifies/conditions the power into a usable form (e.g. modifies the output voltage, transforms DC to AC, etc.).

One or more fuel cell economic controllers 30 may be provided. For example, the system 2 may have a single controller 30. Alternatively, each cluster 10 or each fuel cell module 20 may have a separate economic controller 30, such as a control circuit chip or microcomputer. While the economic controller 30 may comprise the same device as the supervisory controller 25, preferably the controllers 25 and 30 comprise separate devices. The fuel cell economic controller 30 is capable of controlling each individual fuel cell module 20. Each fuel cell cluster 10 is operably connected via a bidirectional link to a data server 50. It should be understood that the bidirectional link and any operable connection mention herein may be implemented by any physical wire, cable or fiber optic method as well as wirelessly.

As shown in more detail in FIG. 3, the connection between each fuel cell module 20 and the data server 50 is provided via a gateway 40. Preferably, the gateway 40 is a computer that receives and sends information related to a fuel cell cluster 10 to the data server 50. The gateway may also perform supervisory control. Typically the gateway 40 is located in close physically proximity to the fuel cell cluster (or clusters) 10 that it serves. The data server 50 is operably connected via a bidirectional link to a model server 60. In addition, as shown in FIG. 2, the model server 60 may be operably connected to an operator advisory station 70, such as a display or control panel, which is operably connected to the fuel cell economic controllers 30. The economic control illustrated in FIGS. 2 and 3 does not mimic or replace the supervisory control because some of the set points are arbitrary and they are determined to meet an economic optimum. The economic control can occur on a much slower time scale than supervisory control, for example with economic adjustments occurring less frequently than once every ten minutes, for example once or twice an hour.

FIG. 3 is a block diagram illustrating the optimization of a multiple fuel cell fleets. As illustrated, a customer 1 has four fuel cell systems or clusters 10. Customer 2 has five fuel cell systems 10. Each fuel cell system 10 may have any number of fuel cell modules 20, such as four, fuel processors and electronics modules. A gateway 40 is configured to interface with one or more fuel cell system 10. As shown, a data server 50 is operably connected via a bidirectional link to each gateway 40. Data regarding the operation of each fuel cell system 10 is passed to the gateway 40. The gateway 40 then passes the data to the data server 50.

The data server 50 collects data from each fuel cell system 10 during operation. Typically, the data is operational information about the fuel cell system 10 and each fuel cell module 20. The data server 50 receives and stores stack and/or BOP operating data, such as operating temperature, fuel flow rate and utilization, output power, setting, as well as the other operating data listed above from multiple fuel cell clusters 10 (possibly from multiple sites and/or multiple customers). The data server 50 can also send data back to the gateway 40, typically the data is in the form of desired operational set points for the fuel cell clusters 10. Either the individual gateway or the data server can also calculate derived properties, e.g. fuel cell efficiency from fuel consumption and power generation. Among other information, the data describes how efficiently the fuel cell system 10 is operating. The data server 50 may also perform a data reconciliation function based on the data received. Operating data from process equipment can be imprecise, inconsistent and/or inaccurate due to instrumentation limitations. Data reconciliation uses relative instrument reliabilities and models that incorporate physical characteristics of the process to adjust the measured values from the instruments to a consistent set of likely, "true" values.

The data server 50 can also send data to and receive data or "tags" from the model server 60. For example, the data server 50 may be configured to store the operational data of numerous fuel cell clusters 10. However, to expedite the modeling and optimization advantages of the model server 60, the data server 50 is configured to selectively provide the model server 60 data pertaining to the specific customer, and or fuel cell cluster 10 of interest. Alternatively, due to bandwidth and/or computer limitations, multiple data servers 50 may be used in conjunction with multiple model servers 60.

The model server 60 is configured to model the operation of the power generation fleet 2. In addition, based on the data acquired by the data server 50, the model server 60 is configured to perform online optimization of the power generation fleet 2, i.e., optimize the operation of the power generation fleet 2 being modeled. The model server 60 is configured to run in real-time concurrent to the operation of the power generation fleet 2. It should be noted that the terms "real-time" and "real-time optimization" means that the model uses very recent data but does not mean that the model has to use data from the exact same moment. Thus, the term "real-time" includes within its scope and can be referred to as "near real-time." As shown in FIG. 3, the model server 60 may be configured to optimize the operation of each customer site independently or simultaneously. Alternatively, each customer site may have its own model server 60.

Figure 4:
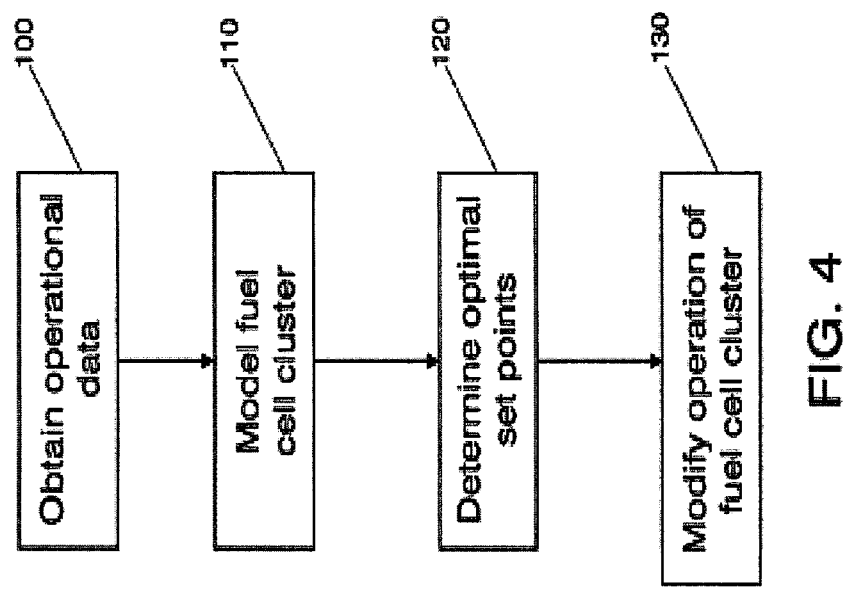
FIG. 4 is a flow chart describing the operation of a power generation fleet according to an embodiment.

FIG. 4 is a flow chart that outlines the optimization process. First, operational data of the fuel cell clusters 10 is obtained (Step 100) by the data server 50. This information is transmitted to the model server 60. Operation of the fuel cell clusters 10 is then modeled (Step 110). The model server 60 then determines set points for each fuel cell module 20 that will allow the power generation fleet 2 to obtain optimal economic and operational efficiency such as an optimal fuel utilization rate, and/or the lowest operating cost (Step 120). The suggested set points are transmitted back to the data server 50. Accordingly, the data server 50 modifies the operation of the fuel cell clusters 10 to approach the suggested operational set points (Step 130).

The model server 60 may be configured to execute at a regular interval (e.g., once every hour). The model server 60 produces a high fidelity model of the fuel cell fleet 2. The model server 60 is automated such that portions of the model that are not applicable to a specific customer may be deactivated. For example, as shown in FIG. 3, portions of the model associated with fuel cell system 10 (two, four and five for customer two) would be deactivated for customer one. The model server 60 acquires the operational data of the fuel cell systems 10 via the data server 50 and is configured to simulate conditions indicated by the operational data. The model server 60 is further configured to re-calibrate itself to simulate optimum operational efficiency of the power generation fleet 2 by determining the economic and operational optimum set points of the power generation fleet 2. An operational optimum can be related to maximizing efficiency while economic optimums may include configuring the power generation fleet 2 to lower operating cost or maximize profit. Operational optimums are also directed toward desired future operational performance. For example, it may be desired to maximize the profit of the fleet 2 while taking into account expected stack degradation and replacement and maintenance costs.

The optimization operation can be continuous, such as regulating the fuel flow rate and/or temperature of a fuel cell module 20, or discrete, such as specifying which type of fuel should be used (i.e., natural gas or propane, etc.) or whether a specific fuel cell stack or module should be operational at all. The model server 60 passes the re-calibration data back to the data server 50. The model server 60 transmits data to the data server 50 to reconcile, estimate and optimize the power generation fleet 2. In turn, the data server 50 sends commands to individual fuel cell modules 20 in order to re-calibrate the power generation fleet 2 so that it operates at optimum levels based on the set points calculated by the model server 60. Alternatively, the model server 60 may be configured to send re-calibration data as recommendations to an operator advisory station 70 instead of the data server 50. The operator advisor station 70 allows a human operator to review the model server's 60 set point recommendations before they are carried out. In turn, the operator can accept or reject or modify the model server's recommendations. In addition, the operator advisory station is configured to allow the operator to automatically or manually send set point data to the fuel cell controller 30.

The operational capabilities of the model server 60 will now be described in further detail. The model server 60 is configured to carryout several functions during a single run cycle to obtain economically and operationally desirable set points. For example, the model server 60 is capable of time averaging received data values to damp instantaneous spikes. Alternatively, the model server 60 maybe capable of performing data conditioning which is the rejection and replacement of bad and/or nonsensical data with nominal values for that operational data. The model server 60 is also capable of performing data reconciliation where the model server 60 is executed to reconcile contradictory measurement data based on the expected reliability of individual measurement data.

The model server 60 may be configured to perform parameter estimation. Parameter estimation uses operating data from process equipment to determine one or more characteristic parameters to characterize operation in a model. Typically, the estimated parameter is not a fundamental measurement. For example, the fouling factor for a heat exchanger could be estimated from inlet and outlet flows and temperatures from a heat exchanger and the design value of the heat transfer coefficient. Parameter estimation may be included in a data reconciliation step, or in a separate step. That is, the model server 60 can determine key operational parameters for the power generation system 2 that describe the system's current operation. For example, the model server 60 can determine how much each fuel cell cluster 10 has degraded from balance of plant (BOP) performance data.

With regard to economic considerations, the model server 60 can obtain the price, in real-time, of all utilities (i.e., power, natural gas) being used by the power generation fleet 2. In this context, the price may be non-continuous (i.e., variable as a function of time) in that the price may be affected by such factors as a time of day, demand charges, such as peak charges for a given period (e.g., given day(s) and/or month(s)), and nominations, such as divergences from usage plans communicated to the utility by the utility's customers. Thus, as used herein the "price" offered by a utility reflects the complexities present in a typical commercial utilities contract and includes both a static and a variable price as a function of time. Alternatively, the model server may use the data obtained from the data server 50 in conjunction with other environmental data to perform demand forecasting. Demand forecasting estimates the power demand for an upcoming operating period. For example, an estimate of the power required for air conditioning could be estimated from a forecast for the temperature and relative humidity. Moreover, the model server 60 is configured to use reconciled measurements, estimated parameters and real-time prices to determine optimum set points for each fuel cell module 20 within the power generation fleet 2. For example, each fuel cell module 20 in a fuel cell cluster 10 can be set to produce a different amount of power and/or to utilize a different amount of fuel and/or operate at a different temperature from one or more other modules. In the alternative, the model server 60 can instruct the data server 40 to not vary the power output of a particular fuel cell module 20 by more than 5% or that the stack temperature must be kept below a certain temperature. The model server 60 can also specify that the stack degradation rate must be kept below a specified ratio (e.g., 3%/10000 hours) or that a specific fuel cell module 20 not be operated at all for various reasons including repairs.

Alternatively, the model server 60 can be configured to take into account customer specific features. For example, if the customer is a data center, power use is expected to be divided between clean power for running the servers, and normal power for running the air conditioning. Model server 60 calculations to determine the optimum power generation level, as well as the control fleet set points to generate that power could take into account one or more of the (1) real-time utility pricing information (natural gas or electricity) (2) the customer specific utility contract information (e.g. what is the likelihood of setting a new peak for power consumption from the grid) and (3) the customer specific demand information (e.g. estimating the air conditioning load from the outside temperature, relative humidity and server load, or estimating the server load based on the time of day).

There is currently no solution for conducting real-time, on-line data conditioning, data reconciliation, parameter estimation, model execution and model optimization for fuel cell systems, clusters of fuel cell systems for one site, or clusters of fuel cell systems across multiple sites. The multiple site based optimization achieved by the power generation system leads to more efficient operation for energy customers and higher profit for energy suppliers.

Figure 5:
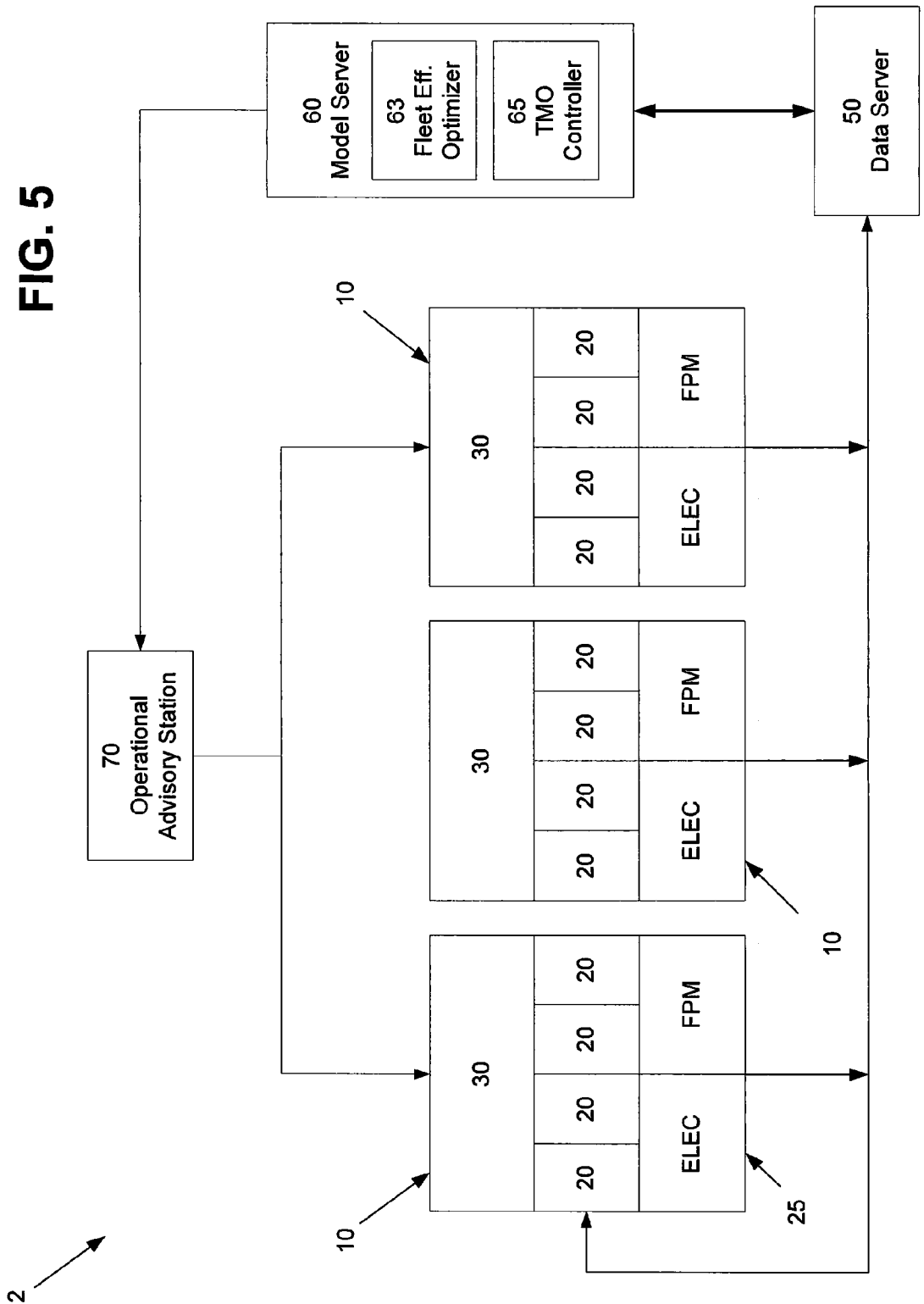
FIG. 5 is a block diagram illustrating a model server according to an embodiment.

FIG. 5 is a block diagram illustrating a model server according to an embodiment. In this embodiment, the model server 60 comprises at least one of a fleet efficiency optimizer or controller 63 and a total maintained output (TMO) (for example, output power) controller 65. Preferably, server 60 contains both. The efficiency optimizer/controller 63 operates to set an optimum efficiency for a given power output level of a fleet as set by the output power (TMO) controller 65. In an embodiment, the fleet 2 may be operated for a single entity (e.g., a customer) by a third party (e.g., a supplier of power) to deliver a fixed amount of power. In this embodiment, the efficiency optimizer 63 may be configured to generate a model of each individual fuel cell system or cluster 10 which will predict the output power and efficiency of an individual system 10 based upon the current set point to an individual fuel cell or a fuel cell stack, column or segment.

According to one embodiment, the efficiency (e.g., a ratio of total power delivered to total fuel used) of an individual system 10 is determined by the power output and fuel input.

The fuel cell output power is used to provide the energy to drive the balance of plant (BOP) loads. After prolonged operation the fuel cell electrical resistance increases. This requires more BOP load for cooling and causes a concomitant decrease in fuel cell output voltage.

In an embodiment, three factors are analyzed from historically logged data. First, the efficiency optimizer 63 calculates the difference between the expected BOP power consumption and the actual measured BOP power consumption of the fuel cell system 10. Second, the efficiency optimizer 63 calculates the change in resistance of each fuel cell in each fuel cell system 10 of the fleet by determining the current resistance and comparing it to an expected resistance. The resistance of a fuel cell, fuel cell stack, column or segment at any particular time may be determined from current and voltage measurements of each fuel cell fuel cell stack, column or segment within each fuel cell system or cluster 10. Third, the power loss for each component in the power conditioning system (PCS) is calculated. Each of these calculations can be functions of current, system age, and other process variables.

The efficiency optimizer 63 uses these factors to generate a model of each individual fuel cell system 10. The model is used to predict the output power and efficiency of an individual system based upon the current set point to an individual fuel cell. This model is used in a numerical optimization algorithm to predict the efficiency and output power for a fleet of one or more systems. The efficiency is then optimized by adjusting the set points of a system 10 to minimize the fuel consumption while maintaining system output power and prolonging system life.

In another embodiment, the total maintained output (TMO) (for example, the power output) of a fleet 2 is the integrated time average output power of the one or more fuel cell systems 10 that make up the fleet. In an embodiment, the TMO is expressed as a percentage of rated nameplate output power for a system 10, a customer site, or a fleet 2 of systems 10 defined by contractual performance requirements. The TMO may be calculated on a lifetime, quarterly, monthly, or weekly basis. The TMO controller 65, which may also be referred to as an output power over time controller, monitors the power output from a fleet 2 of systems 10, integrates the value over time, and compares the result to the TMO set point required for the fleet 2. If one or more systems 10 in the fleet 2 are shut down, the TMO controller 65 will increase the power command to the fleet 2 in order to make up for the lost output power. The increase in power will correct for the time-integrated error caused by the lost output power. The TMO power command is sent to a optimizer 63 to minimize the fuel consumption (maximize efficiency). This will enable the contract obligations to customers to be exactly met at the end of each arbitrary billing period. Alternatively, profit, cost and/or system 10 useful operating lifetime may be optimized instead of or in addition to efficiency.

Figure 6:
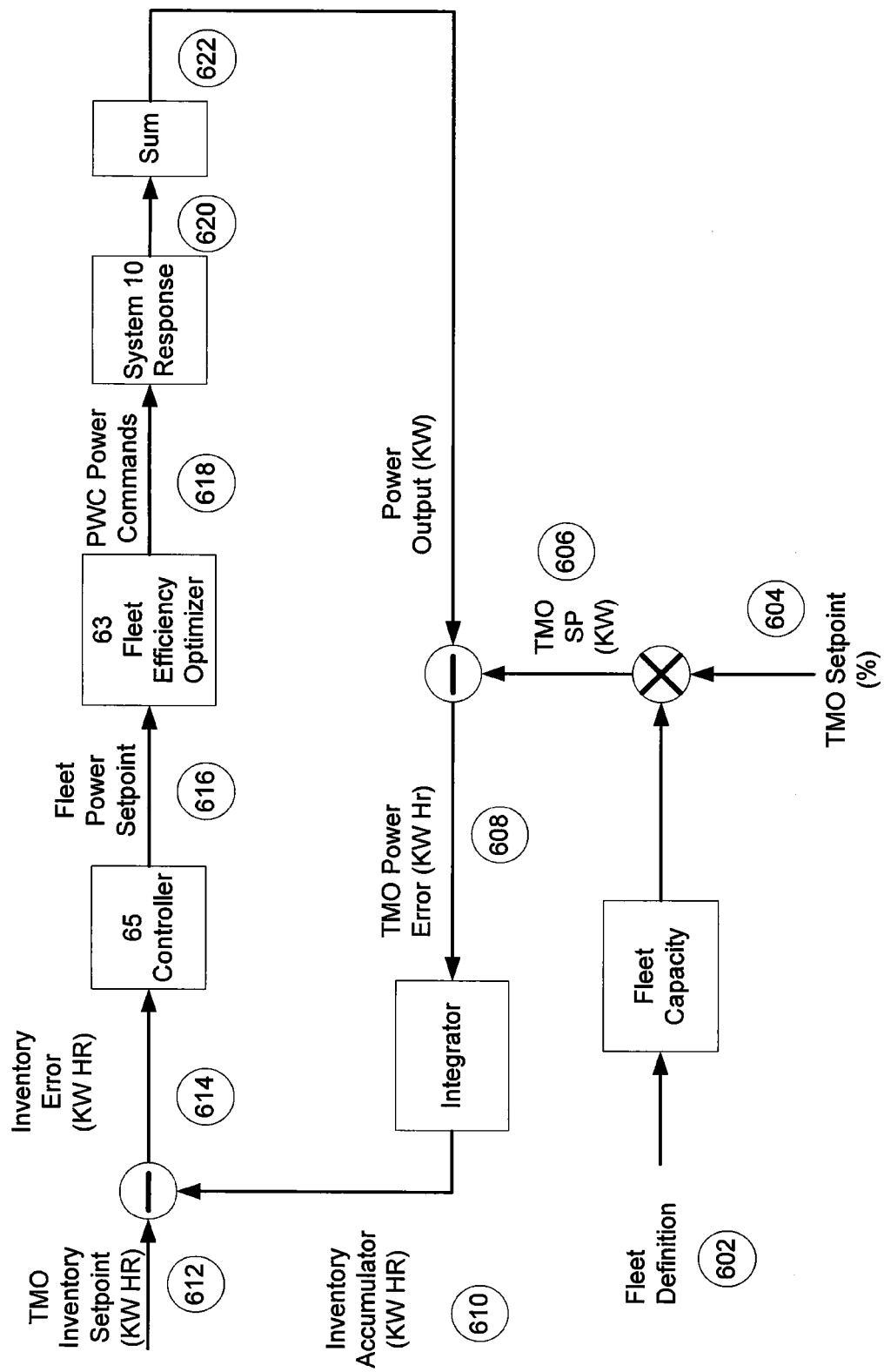
FIG. 6 is a block diagram illustrating a TMO control flow according to an embodiment.

FIG. 6 is a block diagram illustrating a TMO control flow according to an embodiment.

The fleet 2 is defined (Circle 602) at least in terms of its capacity (e.g., maximum power that can be output). A TMO fleet setpoint (Circle 604) is established as a percentage of the fleet capacity. For example, the TMO fleet setpoint as initially established may be set to maximize the efficiency of the fleet (e.g., as determined by optimizer 63) while meeting contractual obligations to the customer.

The fleet setpoint is compared to the actual power output of the fleet (Circle 606) and the difference is expressed as a TMO power error (Circle 608) in KW. By way of illustration and not by way of limitation, the actual power output of the fleet may be less than the fleet setpoint because of a complete or partial failure of a fuel cell system within the fleet or because of aging of the of the fuel system components.

The TMO power error is integrated over time (Circle 610) to produce a measure ("inventory accumulator" in units of KW hr) of the output of the available system inventory over the time period used to determine the TMO. The inventory accumulator value reflects the actual power received by the customer from the fleet at a point in time.

TMO inventory setpoint is compared to the inventory output (Circle 612) to produce an inventory error (Circle 614), which error represents a deficiency in the KW hr power output of the fleet. The TMO controller 65 receives the inventory error and establishes a new fleet power setpoint that reflects the operational inventory of systems within the fleet (Circle 616). The new fleet power setpoint is received by the fleet efficiency optimizer 63 to produce power commands for the power conditioners of each operational system or cluster 10 within the fleet (Circle 618) that optimizes the efficiency of fleet 2. The response of each operational system within the fleet is measured (Circle 620) and summed (Circle 622) to produce the total power output value in units of KW. This summed value is again compared to the TMO setpoint (Circle 608).

In an embodiment, the fleet setpoint (Circle 604) is initially matched to the load of a customer. The TMO controller 65 may adjust the initial setpoint according to information provided to the model server 60 by the data server 50 (see FIG. 5). The initial TMO inventory setpoint (Circle 612) is established from the fleet setpoint assuming a level of operation of the fleet. The inventory setpoint may change based on the current state of the fleet and the inventory error (Circle 614).

While under ideal conditions, the customer's requirements will be met while operating the fleet at or near its ideal efficiency (determined by the total fleet power output divided by the total fleet fuel input), conditions may arise where the fleet is not available to supply power to the customer. In an embodiment, the decisions of the efficiency optimizer 63 are subjugated to the determination of the TMO controller 65. In this embodiment, achieving the power delivery commitments to a customer will take precedence over operating a fleet at its optimum efficiency. However, the efficiency optimizer 63 will determine the most efficient operating parameters of the fleet given the total fleet power output determinations of the TMO controller.

As described previously, a measure of efficiency for a fleet of fuel cells is total the power output of the fleet divided by the total fleet fuel input. One way to improve efficiency is to optimize the fuel consumption of a fuel cell system 10.

Figure 7:
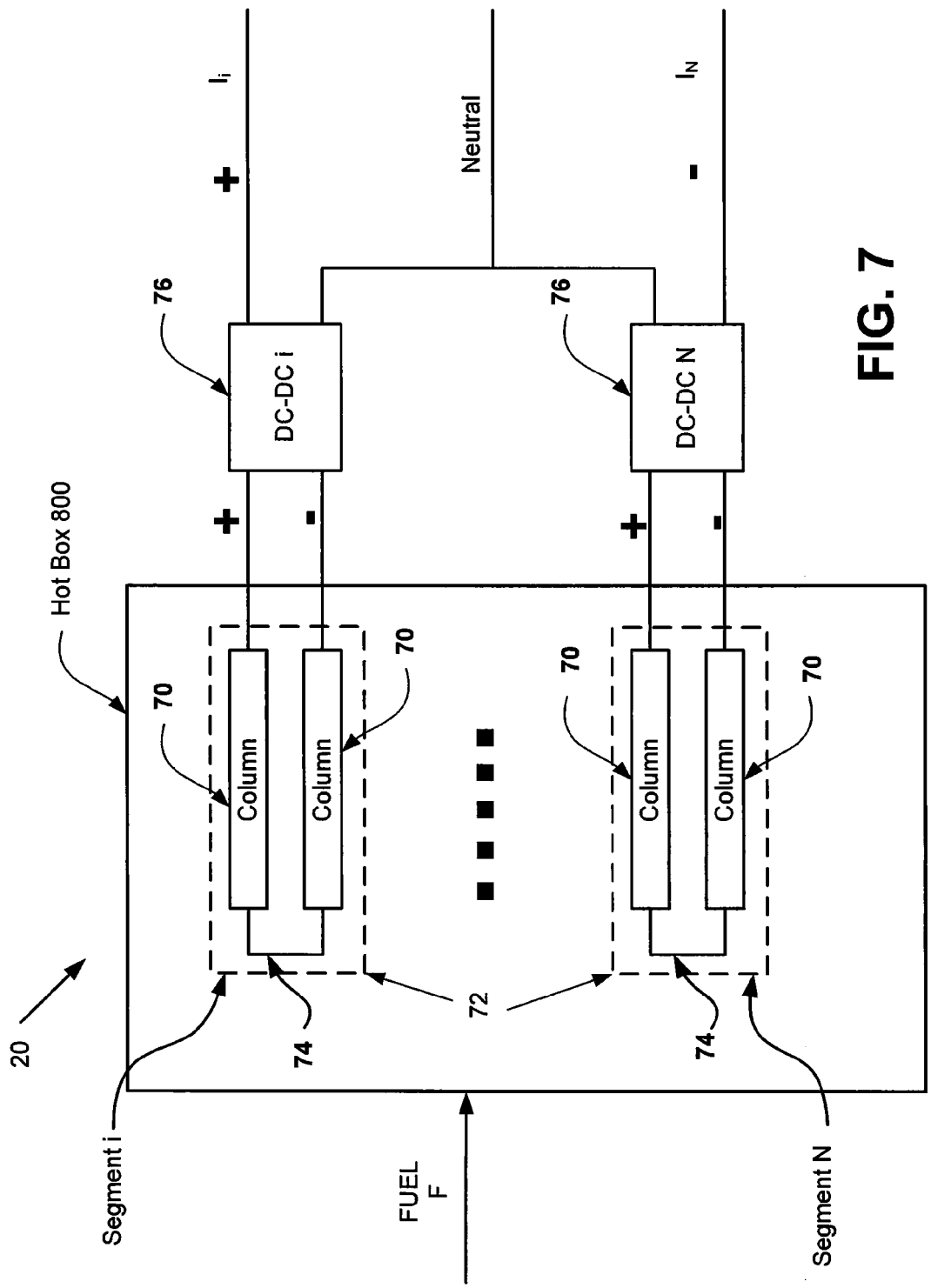
FIG. 7 is a block diagram illustrating a fuel cell module according to an embodiment.

FIG. 7 is a block diagram illustrating a fuel cell module according to an embodiment. In this embodiment, the fuel cell module 20 comprises fuel cell columns 70 interconnected to form "N" fuel cell segments 72 with "I" fuel cell segment current output for each of the N segments. As illustrated in FIG. 7, the individual fuel cell segments 72 may be subjected to differing current commands, but a default shared proportion of the total fuel flow (F) in the module 20. Every column may have one or more fuel cell stacks, such as four to eight stacks. A module 20 may have two to twenty segments 72, such as four to eight segments. Each segment 72 may have one or more columns, such as two columns 70 connected in series by a jumper 74. As illustrated in FIG. 7, a hot box 800 contains the segments 72 (segments "i" through "N") formed from columns 70. The "+" and "−" outputs of each segment 72 are connected to DC-DC converter 76. The outputs of the DC/DC converters 76 are connected to form a dual bus that provides three phase voltage ("+," "−," and neutral) to an inverter (not illustrated).

According to an embodiment, a measure of fuel utilization $U_{fN}$ for a segment N is defined as $Uf_N = I_N/F_N$. In an embodiment, $F_N$ is determined by measuring the backpressure (i.e., the resistance to fuel flow in each segment) of a segment to determine the fuel flow through the segment. $I_N$ is determined for each segment. For the module, $U_{f-overall} = I_{total}/F$, wherein $F = \Sigma_{1 \to N}(F_i)$.

While the $U_f$ limit for each fuel cell must be observed in order to prevent damage to the cell, some segments may be able to accept a higher current without violating the $U_f$ limit.

In an embodiment, a segment current $I_i$ is defined as $I_{segment}$ $i = I_i + \delta I_i$ sdf. In this embodiment, $\delta I_i$ is an additional current requirement commanded to the DC-DC converter that is connected to segment "i." For example, this additional current may have a magnitude of about 0.1 amps per day. This additional current requirement does not result in any increase in fuel consumption F by the module. Thus, the current has been increased without an increase in fuel usage by the module.

When the module reaches equilibrium, $U_{f1}, U_{f2}, U_{f3}, \ldots U_{fN}$ are evaluated to determine the lowest $U_f$. In an embodiment, the evaluation of $U_f$ is conducted by perturbing the current or fuel flow and monitoring $dV/dU_f$. In another embodiment, the evaluation of $U_f$ is determined by an electro impedance specific (EIS) measurement.

In yet another embodiment, the evaluation of $U_f$ is determined by reference to a voltage-current (V-I) plot of each segment. In this embodiment, all of the segments are deemed to have the same operating characteristics. The output current $I_{out}$ of each segment is measured. The temperature in each segment is measured using, for example, a thermocouple. The voltage $V_{out}$ of each segment is known. $V_{out}$ is therefore, a function of $I_{out}$, temperature and $U_f$. $U_f$ may be calculated from $V_{out}$, $I_{out}$, and temperature. Additionally, if the temperature of the segments is the same or about the same, then $U_f$ is proportional to the output current such that if $I_{out}$ of segment 1 is greater than $I_{out}$ of segment 2, then $U_f$ of segment 1 is greater than $U_f$ of segment 2.

For the segment with lowest $U_f$ or best "health," one increment of $\delta I_i$ is added to the output current and a new steady state is reached. The application of $\delta I_i$ results in an increase in heat due to $(\delta I_i)^2 R$. The selected segment "i" will become hotter. As it becomes hotter, flow back-pressure will increase. $U_{fi}$ for the selected segment will increase further as a result. $U_f$ for other segments will decrease as a result (leaving them in a more healthy condition).

The state of the module is evaluated after the application of $\delta I_i$, and one of the following occurs: (a) Conditions are maintained; (b) $\delta I_i$ is removed (if the selected segment suffers); (c) one more $\delta I_i$ is injected for the selected segment; or (d) selecting a different segment for the application of $\delta I_i$ based on a change in $U_f$ that renders the different segment the current "healthiest" segment. The process is iterated periodically as desired.

Figure 8:
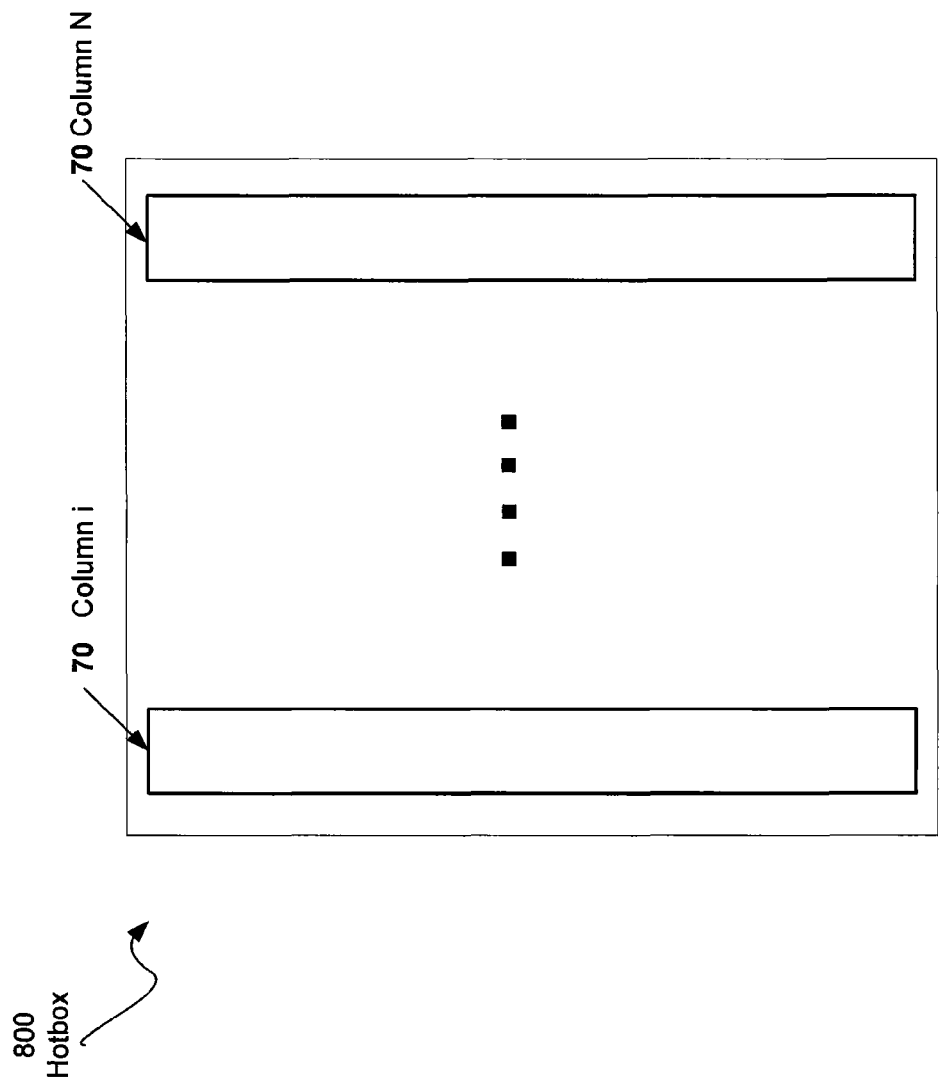
FIG. 8 is a block diagram illustrating a hotbox having columns i through N.

FIG. 8 is a block diagram illustrating a hotbox in module 20 having columns i through N. In an embodiment, the maximum fuel utilization $U_f$ of the hotbox 800 is determined from historical data. The fuel utilization sensitivity (FUS) of each of the cold columns of a fuel cell segment is determined by drawing incremental current $\delta I$ from the cold columns. The voltage of a fuel cell column ($V_{out}$) is a function of the column's fuel usage ($U_f$). A change in $V_{out}$ in response to the application of incremental current $\delta I$ represents the FUS of the column. Drawing more current from a column will increase both its current I and resistance R thereby increasing the column temperature. The current may be limited by a maximum fuel utilization for a column that may be determined from historical data. The process is iterated to find a more uniform thermal distribution (and better efficiency) among the columns. In another embodiment, weighted constraints are imposed on local $U_f$ and thermal uniformity of a hot box. The hotbox is then monitored to determine a maximum efficiency. The weights on the two constraints can be changed over system operational time.

Figure 9:
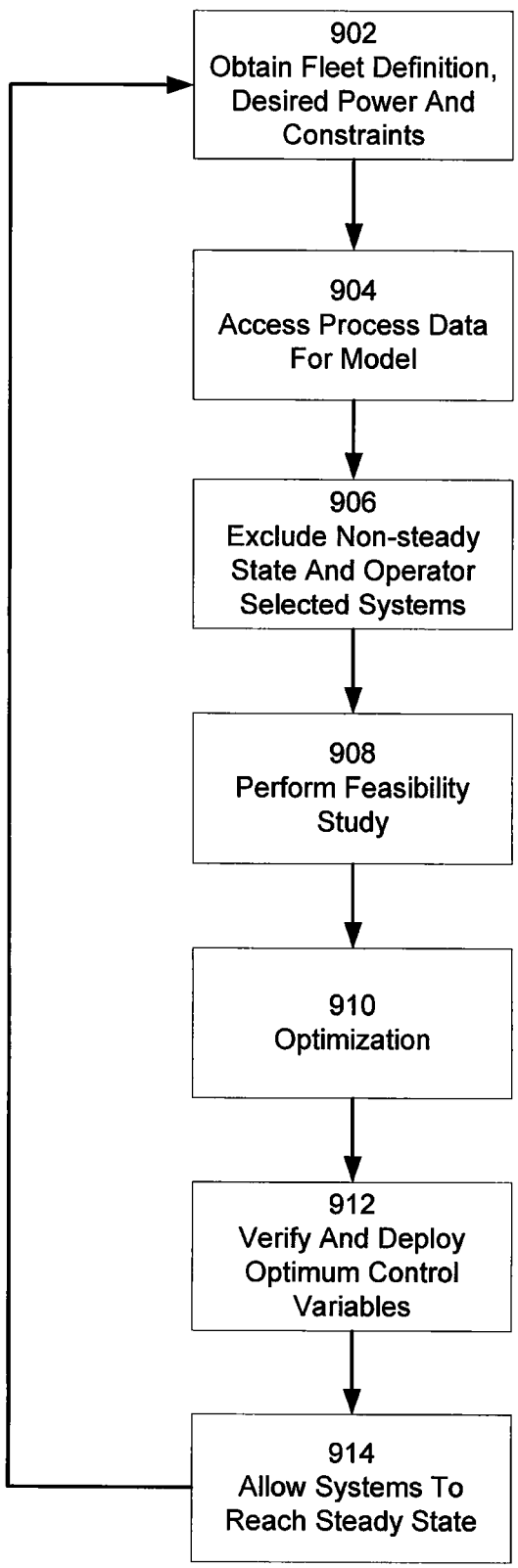
FIG. 9 is a system block diagram illustrating logic flow of an optimization process according an embodiment.

FIG. 9 is a system block diagram illustrating logic flow of an optimization process according an embodiment.

The fleet is defined 902. The fleet definition may identify systems that make up the fleet, the power to be generated by the fleet and any constraints on the operation of the fleet or fleet components. By way of illustration and not by way of limitation, the constraints may be expressed as set points or ranges for particular operating parameters that may be used by control elements to regulate the operation of the fleet or fleet components.

Process data regarding the fleet is accessed and the fleet modeled 904. The model is preferably initialized with near real-time process data so that accurate process variables (e.g., parameters) can be calculated. For example, the data may comprise a margin table of electricity and fuel (e.g., natural gas) prices for each installed system in the fleet. This data is used to optimize the profit of the fleet as described below.

Non-steady-state systems and operator selected systems in the fleet may be excluded from the optimization process. By way of illustration, a system within the fleet that is coming on line may be excluded from the optimization process until the system has reached steady state in order not to interfere with other control processes that regulate system start-up. Additionally, systems may be identified that are not appropriate for optimization. For example, a medical facility that provides critical services may be allowed to operate inefficiently to assure that the critical services are not interrupted.

A feasibility study is performed 908. The feasibility study may be used to determine whether the fleet as defined is a candidate for optimization. If the fleet may be optimized, the feasibility study may also be used to choose a particular optimization methodology (for example, a particular optimization algorithm) for the fleet.

A fleet that is candidate for optimization is optimized according to the selected optimization methodology 910. The optimization process may optimize one or more selected functions, such as system or fleet efficiency and/or operating cost (i.e., profit optimization). For example, one optimization process may use a model-based cost function to arrive at the optimal control variables (e.g., parameters) for a given fleet or collection of fuel cell systems.

The optimization control variables of the selected optimization methodology are verified and then deployed to the fleet 912. The fleet is allowed to reach steady state 914.

The optimization is then iteratively applied beginning at step 902. In other words, the steps 902-912 are repeated after the fleet reaches steady state. With each iteration of the model, a full set of process parameters are calculated and then fed into the cost function. The final output of the cost function is operator defined and may include system efficiency, system power output, system life, profit, or other parameters. Additionally, the optimizer may use operator selected constraints which may include overall fleet efficiency, individual fuel cell system efficiency, overall fleet power, individual fuel cell system power, current set points and other criteria.

Figure 10:
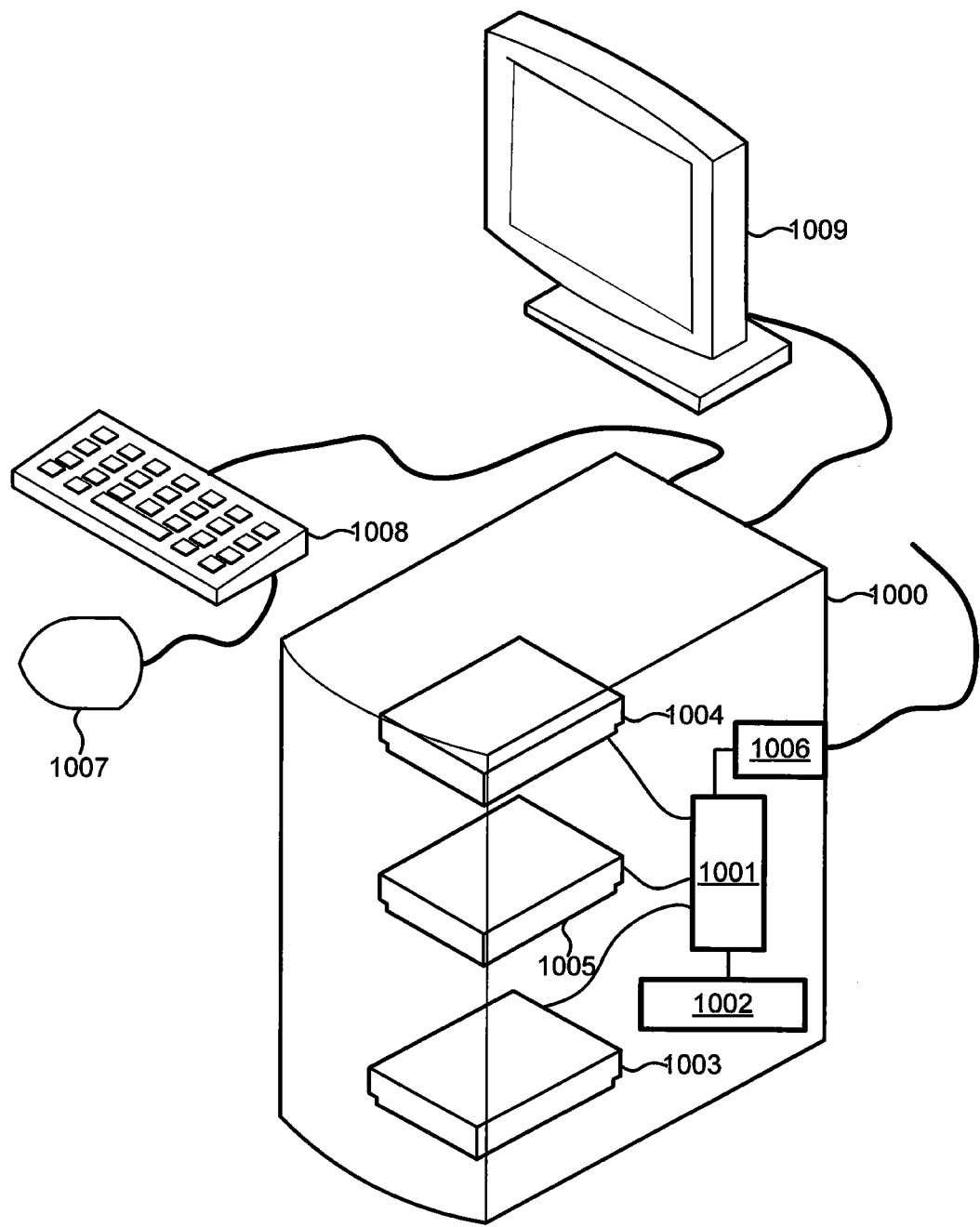
FIG. 10 is a system block diagram of a computing device suitable for use with any of the embodiments.

FIG. 10 is a block diagram of a computing device suitable for use with any of the embodiments. Such a computing device 1000 typically includes a processor 1001 coupled to volatile memory 1002 and a large capacity nonvolatile memory, such as a disk drive 1003. Typically, software applications may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or FireWire connector sockets. In a notebook configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, or a personal data assistant.

Figure 11:
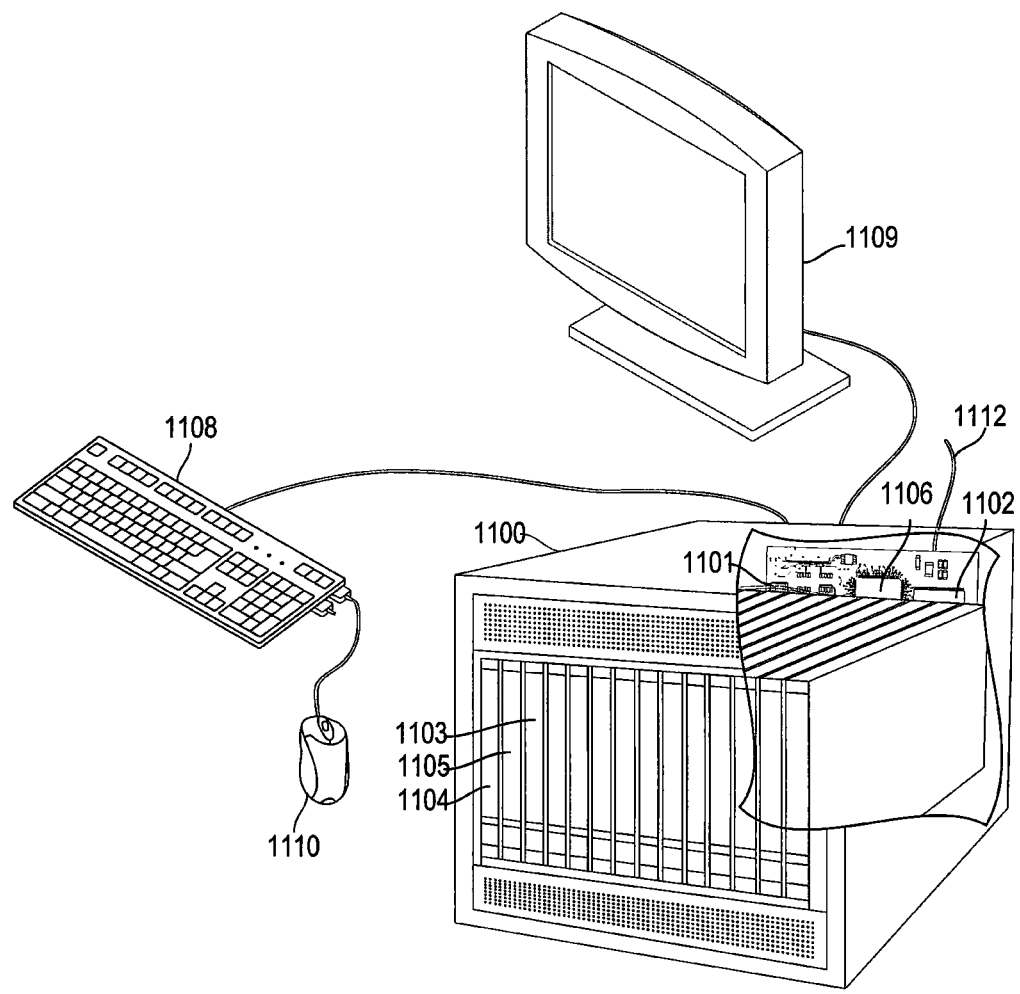
FIG. 11 is a system block diagram of a server device suitable for use with any of the embodiments.

The various embodiments may also be implemented on the on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001 and 1101 may be any programmable microprocessor, microcomputer or multiple processor chip or chips that can be configured by software instructions (applications) to perform a variety of functions, including the functions of the various embodiments described below. In some mobile receiver devices, multiple processors may be provided, such as one processor dedicated to wireless communication functions and one processor dedicated to running other applications. Typically, software applications may be stored in the internal memory 1002, 1102, and or 1103 before they are accessed and loaded into the processors 1001 and 1101. The processor 1001 and 1101 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A power generator, comprising:
a fuel cell fleet comprising a plurality of fuel cell systems, wherein at least one or more of the plurality of fuel cell systems is operational;
a data server operably connected to each of the plurality of fuel cell systems, wherein the data server is configured to obtain operational data from each of the plurality of fuel cell systems; and
a total maintained output (TMO) controller operably connected to the data server and configured to:
   determine a TMO power for the fleet integrated over a first portion of a predetermined time period from the operational data;
   compare the TMO power over the first time period to a TMO power set point established for the fleet for a first portion of the predetermined period; and
   increase the power output of the operational fuel cell systems of the fleet for a second portion of the predetermined time period when the TMO power over the first portion of the predetermined time period is less than the TMO power set point for the first portion of the predetermined time period, wherein the increased power output during the second portion of the predetermined time period is configured to make up for a lost amount of TMO power below the TMO power set point over the first portion of the predetermined time period by an end of the predetermined time period; and
wherein the predetermined period comprises a lifetime of the power generator.

2. The power generator of claim 1, further comprising an efficiency controller operably connected to the TMO controller and configured to:
predict an efficiency and the power output of the fleet from the operational data, wherein the efficiency is determined by a ratio of fleet output current or output power to the fleet fuel consumption; and
optimize the efficiency of the fleet to minimize the fleet fuel consumption while maintaining a desired fleet output power.

3. The power generator of claim 2, wherein each fuel cell system comprises:
a plurality of fuel cell modules, each containing a plurality of fuel cell stacks;
a fuel processing module adapted in operation to deliver fuel to the plurality of fuel cell modules; and
an electronics module adapted in operation to receive power from the fuel cell modules and modify the received power into a usable form.

4. The power generator of claim 3, wherein the efficiency controller is configured to control the operation of each individual system in the fleet.

5. The power generator of claim 2, wherein the fuel cell systems are operably connected to the data server via a gateway.

* * * * *